(12) United States Patent
Houghton et al.

(10) Patent No.: US 11,009,437 B2
(45) Date of Patent: May 18, 2021

(54) ICE TEST DEVICES (71) Applicant: GKN Aerospace Services Limited, East Cowes (GB)

(72) Inventors: Steven Mark Houghton, East Cowes (GB); Susanna Halls, East Cowes (GB)

(73) Assignee: GKN Aerospace Services Limited, Isle of Wight (GB)

( * ) Notice: Subject to any disclaimer, the term of this patent is extended or adjusted under 35 U.S.C. 154(b) by 142 days.

(21) Appl. No.: 16/302,702

(22) PCT Filed: May 19, 2017

(86) PCT No.: PCT/GB2017/051414
§ 371 (c)(1),
(2) Date: Nov. 19, 2018

(87) PCT Pub. No.: WO2017/199050
PCT Pub. Date: Nov. 23, 2017

(65) Prior Publication Data
US 2019/0120738 A1    Apr. 25, 2019

(30) Foreign Application Priority Data
May 20, 2016 (GB) ..................... 1608953

(51) Int. Cl.
*G01N 3/24* (2006.01)
*G01N 19/04* (2006.01)

(52) U.S. Cl.
CPC .............. *G01N 3/24* (2013.01); *G01N 19/04* (2013.01); *G01N 2203/0021* (2013.01); *G01N 2203/0025* (2013.01); *G01N 2203/0037* (2013.01)

(58) Field of Classification Search
CPC ........... G01N 19/04; G01N 2203/0021; G01N 2203/0025; G01N 2203/0037; G01N 3/24
See application file for complete search history.

(56) References Cited

U.S. PATENT DOCUMENTS 2,720,106 A   10/1955   Lippman, Jr.
3,030,797 A    4/1962   Hyman et al.
(Continued)

FOREIGN PATENT DOCUMENTS

CN    101482489 A    7/2009
CN    102262048 A   11/2011
(Continued)

OTHER PUBLICATIONS

International Search Report and Written Opinion for PCT/GB2017/051414 dated Sep. 21, 2017 (21 pages).
(Continued)

*Primary Examiner* — Francis C Gray
(74) *Attorney, Agent, or Firm* — Bejin Bieneman PLC (57) ABSTRACT

Ice test devices include an ice adhesion test device. The ice adhesion test device comprises an ice adhesion test target in the form of a well in which, in use, a layer of accreted ice is built up. The target comprises a sample plate at the bottom of the well and an ice-engagement element positioned circumferentially around the sample plate and providing a side wall of the well, and wherein the sample plate is rotatable relative to the ice-engagement element. The ice adhesion test device also comprises torque means for applying a rotational torque between the sample plate and the ice-engagement element. The ice adhesion test device also comprises transducer means for, at least at a point at which the layer of accreted ice separates from the sample plate, measuring the rotational torque and/or the stress on the ice.

20 Claims, 7 Drawing Sheets

(56) References Cited

U.S. PATENT DOCUMENTS

| | | | |
|---|---|---|---|
| 4,346,602 A | 8/1982 | Gould et al. | |
| 4,458,528 A | 7/1984 | Roper et al. | |
| 6,279,856 B1 * | 8/2001 | Rutherford | B64D 15/14 244/134 D |
| 6,283,411 B1 * | 9/2001 | Giamati | B64D 15/12 244/134 A |
| 8,159,357 B1 * | 4/2012 | Jarvinen | G01V 9/02 340/580 |
| 9,994,327 B1 * | 6/2018 | Zheng | B64D 15/02 |
| 2005/0238428 A1 | 10/2005 | Tandon | |
| 2006/0236778 A1 | 10/2006 | Devilbiss, III | |
| 2008/0128556 A1 * | 6/2008 | Platt | B64D 15/20 244/134 F |
| 2010/0206057 A1 | 8/2010 | Batchelder et al. | |
| 2016/0018315 A1 | 1/2016 | Wang et al. | |
| 2016/0221680 A1 * | 8/2016 | Burton | H05B 3/34 |
| 2018/0142129 A1 * | 5/2018 | Yamamoto | C09D 7/61 |

FOREIGN PATENT DOCUMENTS

| | | |
|---|---|---|
| CN | 102269691 A | 12/2011 |
| CN | 202351164 U | 7/2012 |
| CN | 102735608 A | 10/2012 |
| CN | 103776763 A | 5/2014 |
| CN | 105277485 A | 1/2016 |
| FR | 3019896 A1 | 10/2015 |
| JP | S61 40540 A | 2/1986 |
| SU | 1744602 A1 | 6/1992 |

OTHER PUBLICATIONS

China National Intellectual Property Administration First Office Action and Search Report for Application No. 201780031147.9 dated Dec. 16, 2020 (21 pages; with English translation).

* cited by examiner

ICE TEST DEVICES

CROSS-REFERENCE TO RELATED APPLICATIONS

This application is a national stage of, and claims priority to, Patent Cooperation Treaty Application No. PCT/GB2017/051414, filed on May 19, 2017, which application claims priority to Great Britain Application No. GB 1608953.4, filed on May 20, 2016, which applications are hereby incorporated herein by reference in their entireties.

BACKGROUND

When ice forms on a structure, such as an aircraft structure, the effects can be problematic. Ice formation on an aircraft structure can, for example, change the aerodynamic properties of the structure and increase its weight. If ice that has grown on a structure breaks off, this can cause mechanical damage to the structure or to surrounding structures.

It is therefore desirable to develop effective coatings to prevent or reduce the formation of ice on such structures. These coatings are known as "ice-phobic" coatings. They can be usefully applied to structures such as the leading edge of an aircraft wing, engine blades, or the rotor blades of a helicopter, or wind turbine blades.

When ice-phobic coatings are being developed, a new coating must be assessed for whether it is, in fact, suitably ice-phobic, prior to developing it further or applying it to a structure. Current methods of testing the effectiveness of potentially ice-phobic coatings are, however, unsatisfactory.

One property of a potentially ice-phobic coating that must be tested is the strength of ice adhesion to the coating. The strength of ice adhesion to the coating can be tested by measuring the force required to separate ice from the coating. The results of existing testing techniques do not, however, accurately represent the adhesion of ice formed in the real world, and in particular atmospheric icing.

Atmospheric ice is formed by cooled or super-cooled water droplets freezing on contrast with a structure. The ice formed is also known as "accreted ice", since it is formed by many droplets.

An existing technique for testing the strength of ice adhesion to a coating uses a block of frozen water cooled by a conventional freezing method (a homogeneous glaze ice) between two coated substrates. The ice is not representative of atmospheric ice, and the test thus gives limited useful information on the performance of a potentially ice-phobic coating if its intended application is on a structure exposed to atmospheric icing, for example an aircraft structure.

There is also no satisfactory means of simulating the effects and behaviour of ice formed by "runback" without using a wind tunnel. Such ice, known as "runback ice" is ice that forms when existing ice on one part of a surface melts and re-freezes elsewhere. Runback ice can form, for example, aft of a heated leading edge of an aircraft wing or tailplane, when water droplets freeze on the leading edge and are then melted by the heating system, such that the water runs back and re-freezes. Runback ice can also form on heated propeller blades. In both examples, the above-described problems of increased weight, reduced aerodynamic performance and mechanical damage can occur. It is thus important that the formation of runback ice be properly studied.

SUMMARY

This present disclosure relates to ice test devices such as an ice adhesion test device or an ice runback test device.

According to a first example, there is provided an ice adhesion test device comprising: an ice adhesion test target in the form of well in which, in use, a layer of accreted ice is built up, wherein the ice adhesion test target comprises a sample plate at the bottom of the well and an ice-engagement element positioned circumferentially around the sample plate and providing a side wall of the well, and wherein the sample plate is rotatable relative to the ice-engagement element; torque means for applying a rotational torque between the sample plate and the ice-engagement element; and transducer means for, at least at a point at which the layer of accreted ice separates from the sample plate, measuring the rotational torque and/or the stress on the ice.

The ice adhesion test device, in providing an ice adhesion test target in the form of a well in which, in use, a layer of accreted ice is built up, allows the adhesion of accreted ice to a sample to be tested. When the sample has a potentially ice-phobic coating, the ice adhesion test device can be used to provide a more accurate measurement of the properties of the coating in relation to atmospheric, or accreted, ice, than can be made with a device which uses a block of frozen water.

The torque means for applying a rotational torque between the sample plate and the ice-engagement element allows for a stress to be applied to the ice, such that, if the coating is ice-phobic, the ice will separate from the sample plate or from the ice-engagement element. The transducer means for, at least at a point at which the layer of accreted ice separates from the sample plate, measuring the rotational torque and/or the stress on the ice allows either the torque or the stress on this ice at which this occurs to be measured (or both), thereby indicating the strength of adhesion of the ice to the sample plate.

Sample Plate

The sample plate may be arranged to have a sample fixed to it. The sample plate may be rotatable. The torque means may be arranged to apply the rotational torque to the sample plate. The ice-engagement element may be fixed in position.

When the sample plate is rotatable and the ice-engagement element is fixed in position, the transducer means can measure the rotational torque at which the ice separates from the sample plate, and/or the stress on the ice when it separates—which is of interest when the sample plate bears a potentially ice-phobic coating to be tested—instead of the rotational torque at which the ice separates from the ice-engagement element.

The sample plate may be between 40 mm (forty millimeters) and 100 mm in diameter.

Sample

The ice adhesion test device may comprise a sample fixed to the sample plate. The sample may comprise a composite material. The sample may comprise glass. The sample may comprise metal. The sample may comprise aluminium or steel. The sample may comprise plastic. The sample may comprise polycarbonate, polyether ether ketone (PEEK) or acrylic. The sample may be formed of one or more of these materials. The sample may have a coating of one or more of these materials.

The sample may be between 1 mm and 15 mm in thickness.

Rotation of Ice

The torque means may be arranged to try, in use, to rotate the sample plate relative to the ice-engagement element against the resistance of the layer of accreted ice.

The ice-engagement element may be shaped to prevent rotation of the layer of accreted ice relative to the ice-engagement element. The ice-engagement element may have a non-circular inner peripheral wall. The ice-engagement element may have a circular inner peripheral wall. The ice-engagement element may have an inner peripheral wall which has protrusions for keying with the layer of accreted ice to prevent rotation of the layer of accreted ice relative to the ice-engagement element. The ice-engagement element may have an inner peripheral wall which has recesses for keying with the layer of accreted ice to prevent rotation of the layer of accreted ice relative to the ice-engagement element. The inner peripheral wall, when it has protrusions or recesses, may be substantially circular. The ice-engagement element may be roughened to prevent rotation of the layer of accreted ice relative to the ice-engagement element. The ice-engagement element may have an inner peripheral wall which is roughened prevent rotation of the layer of accreted ice relative to the ice-engagement element.

When the ice-engagement element is shaped to prevent rotation of the layer of accreted ice relative to the ice-engagement element, a more accurate measurement can be made of the adhesion of the accreted ice to the sample. This is because the shape of the ice-engagement element ensures that the ice does not simply rotate freely with respect to the ice-engagement element. Instead, the ice is held in place by the shape of the ice-engagement element such that the rotation of the sample plate imparts stress to the ice. The transducer means can then measure the rotational torque at which the ice ceases to adhere to the sample plate, and/or the stress at which this occurs.

Variable-Diameter Ice-Engagement Element

The ice-engagement element may be arranged to be adjustable in diameter. The ice-engagement element may have an adjustable inner diameter. The ice-engagement element may be arranged to define an area of the sample plate to be exposed to water droplets. The side wall may be arranged to be adjustable in diameter.

In this way, the area to be exposed to the spray of water droplets can be adjusted to allow for different sizes of sample plates to be used with the device. It also allows for different areas of a particular size of sample plate to be exposed to the spray of water droplets and thus to have ice accrete on them. This provides for further differentiation between samples based on their apparent icephobicity with a particular area exposed to the spray of water droplets. For example, a "poor" sample would have ice break cohesively rather than adhesively even on a relatively small exposed surface area. A "good" sample would have low ice adhesion over a larger exposed surface area.

According to a second example, there is provided an ice adhesion test device comprising: an ice adhesion test target in the form of a well in which, in use, a layer of accreted ice is built up, wherein the ice adhesion test target comprises a sample plate at the bottom of the well and an annulus positioned around the periphery of the sample plate; torque means for applying a rotational torque between the sample plate and the annulus and for increasing the rotational torque; and transducer means for, at least at a point at which the layer of accreted ice separates from the sample plate, measuring the rotational torque and/or the stress on the ice.

Optional features of the first example are also optional features of this second example, with changes in terminology being inferred by the skilled person where necessary for the optional features to make sense.

According to a third example, there is provided a runback ice test device comprising: a runback ice test target comprising a platform having an upper face which is separated into a first section and a second section by a protruding thermal barrier; platform inclination means arranged to incline the platform such that the second section is above the first section; first heater means for producing localised heating of the first section of the platform for keeping the first section of the platform substantially free of accreted ice as a layer of accreted ice is, in use, built up on the second section of the platform; second heater means for producing localised heating of the second section of the platform for producing, when the platform is inclined, runback of melted ice from the layer of accreted ice and over the barrier and onto the first, lower section of the platform; and a heater means controller for independently switching on and off the first and second heater means.

The runback ice test device provides for a simulation of the effects and behaviour of runback ice. The formation of runback ice differs from the formation of accreted ice in that runback ice in a particular location is, as discussed above, formed by ice from elsewhere melting and reforming at the location.

By providing first heater means for producing localised heating of the first section of the platform for keeping the first section of the platform substantially free of accreted ice as a layer of accreted ice is, in use, built up on the second section of the platform, the runback ice test device can keep the section of the platform that is lower when the platform is inclined free of ice so that the effects and behaviour of runback ice on the lower section can be studied.

By providing second heater means for producing localised heating of the second section of the platform for producing runback of melted ice from the layer of accreted ice and over the barrier and onto the first section of the platform, the runback ice test device can melt the accreted ice so that it runs onto the first section of the platform, where it may then re-freeze, creating runback ice.

The heater means controller for independently switching on and off the first and second heater means allows the first heater means to be switched on while the second heater means is switched off, thereby providing a mode in which the first section (which is lower when the platform is inclined) is heated to be kept clear of ice and the second section (which is higher when the platform is inclined) is not heated such that ice can be accreted on the second section. It allows the first heater means to be switched off while the second heater means is switched on, thereby providing a mode in which the second section is heated to melt accreted ice, and the first section is not heated to allow runback ice to form on it. It further allows the first and second heater means to be switched on, thereby providing a mode in which both the first and second sections are heated, to clear the platform of ice.

Heater Means Controller

The heater means controller may be for controlling the temperature to which the first and second heater means are heated.

This can allow for a more efficient use of energy (relative to a device in which the temperatures cannot be controlled or are fixed), since if desired, the first heater means can be heated to the minimum temperature at which the first section can still be kept clear of ice, taking into account the temperature within the chamber. This uses less energy than if the first heater means were heated to a higher temperature.

The heater means controller for controlling the temperature to which the first and second heater means are heated also allows for the simulation of a wider variety of runback icing conditions than with devices in which the temperatures are fixed.

Adjusting the Angle of Inclination

The platform inclination means may be arranged to adjust the angle of inclination of the platform of the runback ice test target.

When the platform inclination means is arranged to adjust the angle of inclination of the platform of the runback ice test target, the runback ice test device can be used to simulate the formation of runback ice on a variety of different structures or at different angles of inclination of those structures. For example, the angle between a heated portion of a wing and a portion of a wing on which ice runback may occur may be different from the angle between a heated portion of a tailplane and a portion of the tailplane on which ice runback may occur. The means for adjusting the angle of inclination of the platform of the runback ice test target allows the same runback ice test device to test ice runback at either of these angles, thereby simulating ice runback on either of these structures.

Platform Materials

The platform may comprise a composite material. The platform may comprise glass. The platform may comprise metal. The platform may comprise aluminium or steel. The platform may comprise plastic. The platform may comprise polycarbonate, polyether ether ketone (PEEK) or acrylic. The platform may be formed of one or more of these materials. The platform may have a coating of one or more of these materials. The first section may comprise a first one of these materials and the second section may comprise a second one of these materials.

Platform Dimensions

The platform may have a thickness of between 1 mm and 5 mm. The platform may have a thickness of 2 mm. The platform may have a width of between 40 mm and 70 mm. The platform may have a width of 58 mm. The platform may have a length of between 40 mm and 70 mm. The platform may have a length of 45 mm.

BRIEF DESCRIPTION OF THE DRAWINGS

Specific embodiments will be described below by way of example only and with reference to the accompanying drawings, in which.

DESCRIPTION OF CERTAIN EXAMPLE EMBODIMENTS

Overview

Figure 1:
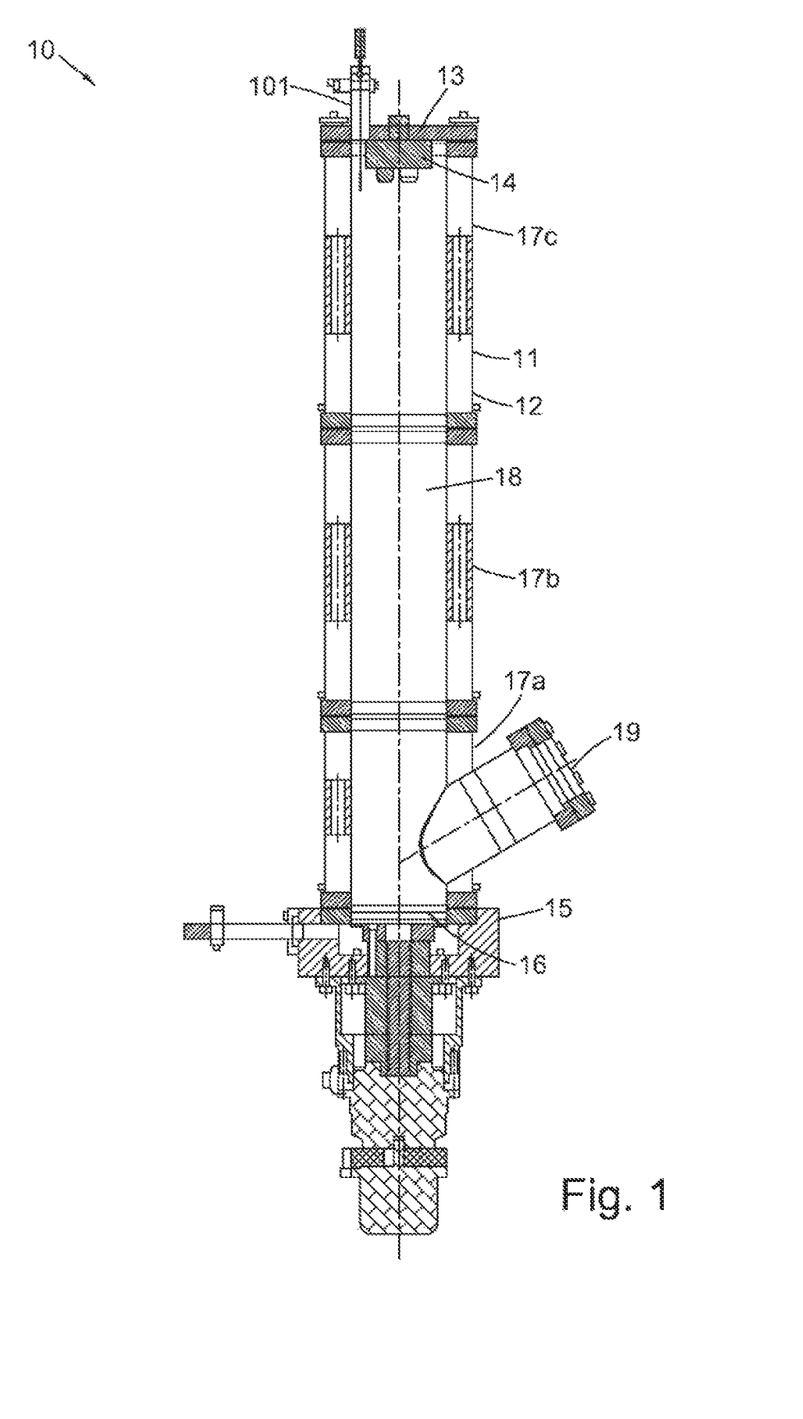
FIG. 1 shows a cross-sectional view of an ice accretion apparatus in the form of a bench-top icing device.

FIG. 1 shows an ice accretion apparatus in the form of a bench-top icing device 10. In overview, the bench-top icing device 10 (hereinafter, the "icing device") is shaped as a column 11. The column 11 is defined by a side wall 12 (hereinafter, a "wall"), which in this embodiment is annular in shape. The wall 12 is formed of three tubular segments in the form of wall sections: a first wall section 17a, a second wall section 17b, and a third wall section 17c. The second wall section 17b is stacked on top of the first wall section 17a. The third wall section 17c is stacked on top of the second wall section 17b. In other embodiments, there may be more or fewer tubular segments. In this embodiment, each wall section 17a, 17b, 17c is substantially circular in cross-section. Thus, the wall 12 of the column 11 forms a tube that is substantially circular in cross-section. The wall 12 defines a central chamber 18 (hereinafter a "chamber") within it. This chamber 18 is therefore also substantially circular in cross-section.

At the top end of the chamber 18 there is a droplet discharge device in the form of a nozzle device 14. This nozzle device 14 is part of a top unit in the form of droplet discharge device holder 13. The droplet discharge device holder 13 acts as a lid on the top of the column 11, closing the chamber 18. The droplet discharge device holder 13 is releasably fitted to the third wall section 17c. The nozzle device 14 forms part of a water droplet generation system (not shown in FIG. 1).

At the bottom end of the chamber 18, there is a target. The target is part of a bottom unit which is, in this embodiment, an ice adhesion test device 15. In this embodiment, the target is therefore an ice adhesion test target, which is in the form of a well 16 of the ice adhesion test device 15. The ice adhesion test device 15 is releasably fitted to the first wall section 17a.

The first wall section 17a also has a viewing port 19. The viewing port 19 in the first wall section 17a allows for observation of a sample (not shown) within the well 16.

Water Droplet Generation System

Figure 2:
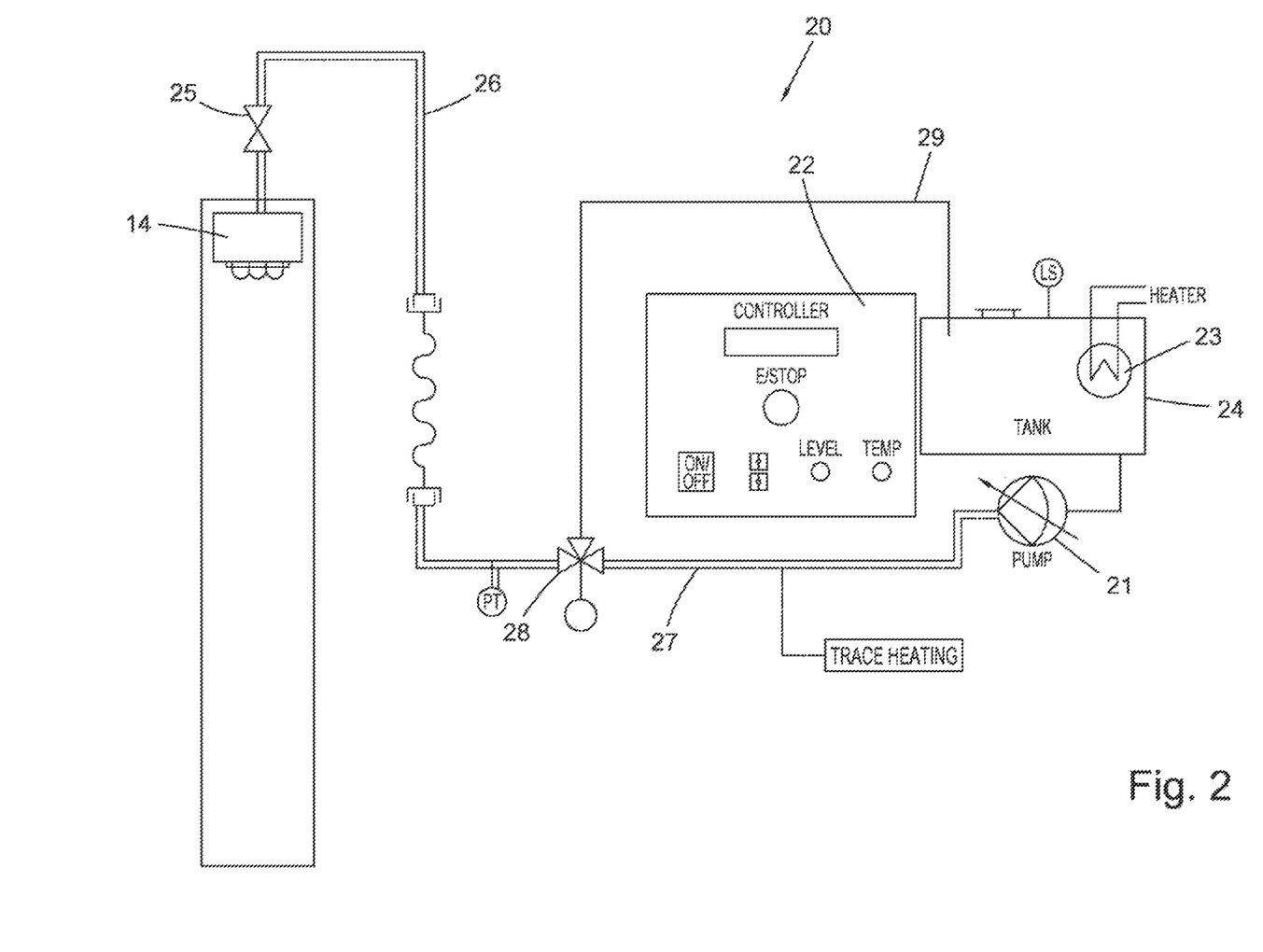
FIG. 2 shows, schematically, a water droplet generation system.
Figure 3A:
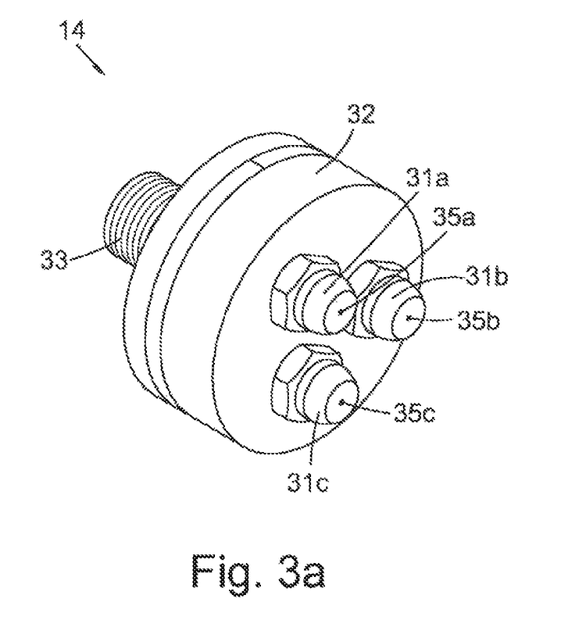
FIG. 3a shows a perspective view of a droplet discharge device.
Figure 3B:
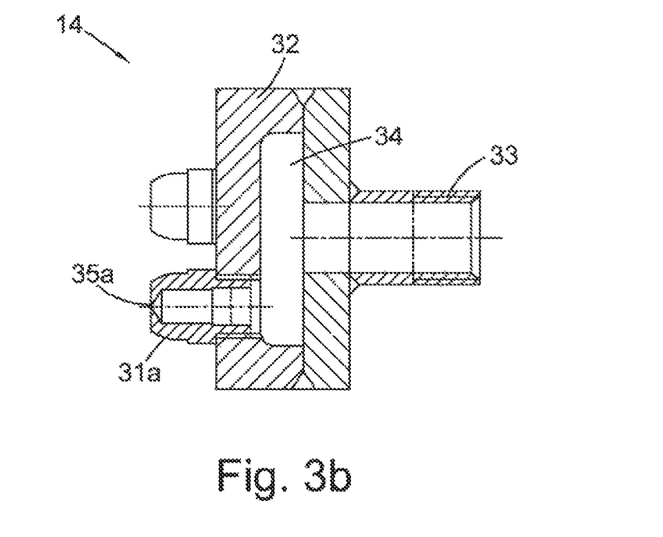
FIG. 3b shows a cross-sectional view of a droplet discharge device.

With reference to FIGS. 2, 3a and 3b, the nozzle device 14 and the water droplet generation system 20 of which it forms part will now be described in more detail. In overview, and with particular reference to FIG. 2, the water droplet generation system 20 comprises the nozzle device 14 in the droplet discharge device holder 13 (not shown in this figure), a water reservoir in the form of a tank 24 and a water supply line 26 that connects the nozzle device 14 to the tank 24. The water droplet generation system 20 also comprises a water reservoir heater in the form of a tank heater 23 in the tank 24, and a water supply line heater in the form of a trace heater 27, as well as a water pressure and temperature controller 22 that controls the tank heater 23, trace heater 27 and pressurising means in the form of a pump 21. Finally, the water droplet generation system 20 comprises, on water the supply line 26, the pump 21, a pressure-reducing valve 28 connected to a bleed line 29 that is also connected to the tank 24, and a gate valve 25.

With continued reference to FIG. 2, the configuration of these components will now be described in more detail. The tank 24 is connected to two lines: the water supply line 26, and the bleed line 29. The water supply line 26 is connected at one end to the tank 24, and at the other end to the nozzle device 14. The bleed line 29 is connected at one end to the tank 24, and at the other end to the water supply line 26. The tank heater 23 is located within the tank 24, to heat water in the tank 24.

Starting at the end of the water supply line 26 that is connected to the tank 24, the configuration of the water supply line 26 will now be described. Between the tank 24 and the nozzle device 14, the water supply line 26 is connected to the pump 21. The pump 21 is arranged so that it can draw water from the tank 24 into the water supply line 26 and thus increase the water pressure in the water supply line 26. Beyond the pump 21 (i.e., on the water supply line 26 and on the other side of the pump 21 from the tank 24), the water supply line 26 is connected to a trace heater 27. The trace heater 27 is arranged to further heat water within the water supply line 26. Between the pump 21 and the nozzle device 14, the water supply line 26 is also connected to a pressure-reducing valve 28. The pressure-reducing valve 28 is a three-way valve that is configured to allow water through the water supply line 26 from the tank 24 towards the nozzle device 14 and from the water supply line 26 (either from the tank 24 side of the pressure-reducing valve 28 or from the nozzle device 14 side of the pressure-reducing valve 28) into the bleed line 29. This serves to reduce water pressure in the water supply line 26 if necessary. The bleed line 29 is connected to the tank 24 so that it can return water bled from the water supply line 26 into the tank 24. Between the pressure-reducing valve 28 and the nozzle device 14, the water supply line 26 is still connected to the trace heater 27. The water supply line 26 is also connected to the gate valve 25. The gate valve 25 is arranged to stop or allow the flow of water through the water supply line 26 from the tank 24 to the nozzle device 14.

As mentioned above, the water droplet generation system 20 also comprises a water temperature and pressure controller 22. The water temperature and pressure controller 22 is arranged to control the tank heater 23, the trace heater 27, the pump 21 and the pressure-reducing valve 28 to control the temperature and pressure of water in the tank 24 and in the supply line 26.

With reference now to FIGS. 3a and 3b, the nozzle device 14 will now be described in more detail. FIG. 3a shows a perspective view of the nozzle device 14. The nozzle device 14 of this embodiment comprises a first nozzle 31a, a second nozzle 31b, and a third nozzle 31c. The nozzles 31a, 31b, 31c are connected to a nozzle device body 32.

As can be seen in FIG. 3b, which shows the nozzle device 14 in cross-section, the nozzle device body 32 defines a nozzle device reservoir 34 within it. The nozzle device reservoir 34 is a space within the nozzle device body 32 that can receive water from the water supply line 26. So that the nozzle device reservoir 34 can receive this water, it is fluidly connected to the water supply line 26 via a water supply line connector 33 of the nozzle device 14. Thus, water can enter the water supply line connector 33 from the water supply line 26, flow into the nozzle device reservoir 34 and be ejected from the nozzle device 14 via the nozzles 31a, 31b, 31c.

Each nozzle 31a, 31b, 31c is substantially the same as each other nozzle 31a, 31b, 31c, and so only the first nozzle 31a (hereinafter the "nozzle") will be described in detail here. The nozzle 31a is shaped as a hollow cone. As mentioned above, the nozzle 31a is fluidly connected at one end to the nozzle device reservoir 34. At its other end, the nozzle 31a defines a nozzle outlet 35a. Thus, water can escape from the nozzle device reservoir 34, through the nozzle 31a and out of the nozzle outlet 35a.

Segments

Figure 4A:
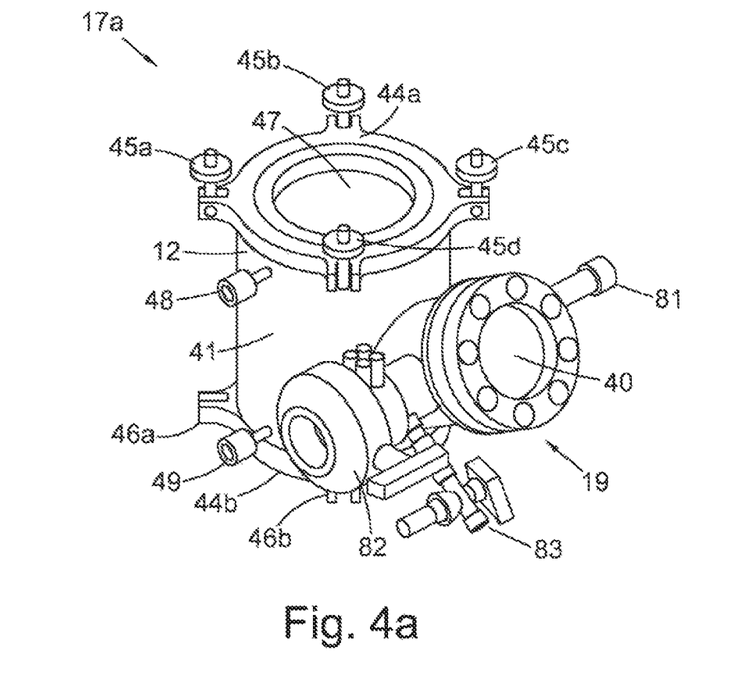
FIG. 4a shows a perspective view of a tubular segment of the ice accretion apparatus, the tubular segment in the form of a first wall section with a viewing port.
Figure 4B:
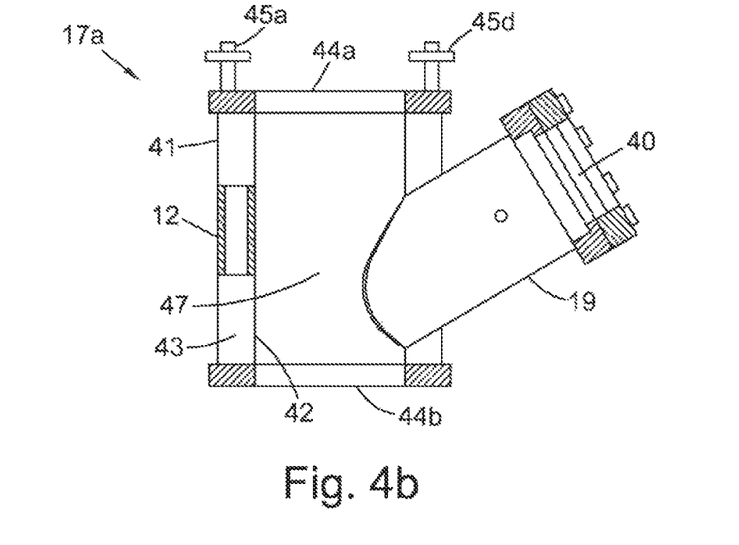
FIG. 4b shows a cross-sectional view of the first wall section with the viewing port.

With reference now to FIGS. 4a and 4b, the first wall section 17a will now be described in more detail. As can be seen in FIG. 4a, which is a perspective view of the first wall section 17a, the first wall section 17a has a body 41 that is substantially circular-cylindrical and defines a first wall section chamber portion 47 within it. This body 41 is made up of a wall 12, an inner wall 42, and first and second flanges 44a, 44b. This can be more easily seen in FIG. 4b, which shows the first wall section in cross-section. The wall 12 is circular-cylindrical in shape. That is, the wall 12 is a circular annulus in cross-section. The inner wall 42 is also circular-cylindrical in shape. The inner wall 42 has a smaller diameter than the wall 12. The inner wall 42 sits within the wall 12. The inner wall 42 and the wall 12 are spaced so as to define a cavity 43 between them. The inner wall 42 and the outer wall 12 are joined at their ends by first and second flanges 44a, 44b. The first and second flanges 44a, 44b can best be seen in FIG. 4a, although only part of the second flange 44b can be seen in this figure. The first and second flanges 44a, 44b are each annular in shape. They are each wide enough to span the gap between the wall 12 and the inner wall 42. The first and second flanges 44a, 44b are arranged to seal this gap. In this way, as just mentioned, the inner wall 42 and outer wall 12 define a cavity between them, which is sealed by the first and second flanges 44a, 44b. The first flange 44a is at one end of the wall 12 and inner wall 42, and the second flange 44b is at the end of the wall 12 and inner wall 42 that is distal the end to which the first flange 44a is fixed.

The wall 12 has an inlet in the form of a first valve 49 and an outlet in the form of a second valve 48. The first valve 49 is arranged to be connected to a supply of cooling fluid (not shown). In this embodiment, the cooling fluid is liquid nitrogen and the liquid nitrogen is supplied by a first liquid nitrogen transfer line that can be connected to the first valve 49 via a first transfer tube. The second valve 48 is arranged to be connected to a second liquid nitrogen transfer line via a second transfer tube. In other embodiments, it is envisaged that the inlet and the outlet may be located in other positions than those shown in the Figures. In one such other embodiment, the inlet is located at the position of the first valve 49 of this embodiment, and the outlet is located at the position of the second valve 48.

The first and second flanges 44a, 44b comprise connectors by which they can be connected to corresponding flanges on other parts of the icing device 10. The first flange 44a comprises four male fixings 45a, 45b, 45c, 45d. These can be most easily seen in FIG. 4a. They are equally spaced from one another around the exterior of the first flange 44a. The four male fixings 45a, 45b, 45c, 45d are substantially the same as one another, and so only one 45a of the male fixings 45a, 45b, 45c, 45d will be described in detail here. The male fixing 45a is made up of a nut and bolt. The bolt is pivotally attached to the first flange 44a. The nut is positioned on the bolt. The bolt is threaded so that the nut can be tightened on the bolt.

The second flange 44b comprises four female fixings 46a, 46b (of which only two can be seen in the figures). The four female fixings 46a, 46b are equally spaced from one another around the exterior of the second flange 44b. The four female fixings 46a, 46b are substantially the same as one another and so only one 46a of the female fixings 46a, 46b will be described in detail here. The female fixing 46a is arranged to receive the bolt of a male fixing such as the male 45 fixing described above. The female fixing 46a is shaped as two prongs between which the bolt of the male fixing 45a can be pivoted.

The second 17b and third 17c wall sections are substantially the same as the first wall section 17a except that they do not comprise a viewing port 19. The female fixings of the second wall section 17b are arranged to be connected to the male fixings 45a, 45b, 45c, 45d of the first wall section 17a. The female fixings of the third wall section 17c are arranged to be connected to the male fixings of the second wall section 17b.

In other embodiments, a tubular segment (wall section 17) may be releasably connected to an adjacent component using a connection system which is different to the system of male fixings and female fixings described above. For example, the connection system may comprise: removable clamps for clamping together adjacent flanges of adjacent components; a removable circumferential band for clipping together the adjacent flanges of adjacent components; or one component may be screwed directly to an adjacent component, e.g., the bottom end of one tubular segment may screw directly into the top end of another tubular component.

As mentioned above, the first wall section 17a comprises a viewing port 19 connected to the body 41. In this embodiment, the viewing port 19 takes the form of a single-walled tube. One end of the tube of the viewing port 19 is connected to the inner wall 42 and wall 12 of the first wall section 17a. The other end of the tube of the viewing port 19 is closed by a viewing window 40 which is, in this embodiment, made of a transparent glass that is resistant to low temperatures, such as borosilicate glass. The inner wall 42 and wall 12 of the first wall section 17a define a hole where the viewing port 19 is connected to them so that the first wall section chamber portion 47 can be viewed through the viewing window 40.

The viewing port 19 also comprises an overpressure protector 81 to which a pressure gauge (not shown) can be connected to gauge pressure within the chamber 18, a butterfly valve 82 to which a vacuum pump (not shown) can be connected to reduce pressure within the chamber 18, and a dry nitrogen connection valve 83 to which a dry nitrogen supply (not shown) can be connected to purge the chamber 18 and thereby reduce moisture within the chamber.

Each of the first 17a, second 17b and third 17c wall sections has chamber heating means in the form of an electric heater jacket arranged circumferentially around the wall section 17a, 17b, 17c. The electric heater jackets are not shown in the figures. In another embodiment, in addition to the electric heater jackets, the icing device also has an insulated jacket around each of the wall sections. This helps to reduce heat transfer between the chamber and the environment, and therefore provides for more energy-efficient and faster heating and cooling than in embodiments in which the insulated jackets are not present.

Top Unit

With reference once more to FIG. 1, the configuration of the top unit—the droplet discharge device holder 13—of the icing device 10 will now be described in more detail. The droplet discharge device holder 13 is shaped as a circular plate. Its outer diameter is the same as the outer diameter of the top flange of the third wall section 17c. The droplet discharge device holder 13 sits on top of the third wall section 17c to act as a lid to the chamber 18 defined by the first, second and third wall sections 17a, 17b, 17c. The droplet discharge device holder has four, evenly-spaced, female fixings around its circumference. These female fixings are substantially the same as the four female fixings 46a, 46b that form a part of the first wall section. They are arranged to mate with corresponding male fixings on the third wall section 17c.

In this embodiment, the droplet discharge device holder 13 also includes the nozzle device 14. The nozzle device 14 is arranged so that its nozzles 31a, 31b, 31c are inside the chamber 18 when the droplet discharge device holder 13 is in place on the third wall section 17c. The water supply line connector 33 of the nozzle device 14 extends through the droplet discharge device holder 13 so that it can be connected to the water supply line 26 outside the chamber 18.

Finally, the droplet discharge device holder 13 also comprises a pressure sensor and a temperature sensor, which in this embodiment are combined in a single sensor device 101. The sensor device 101 extends through the droplet discharge device holder 13 such that it can sense the pressure and temperature within the chamber 18.

Ice Adhesion Test Device

Figure 5A:
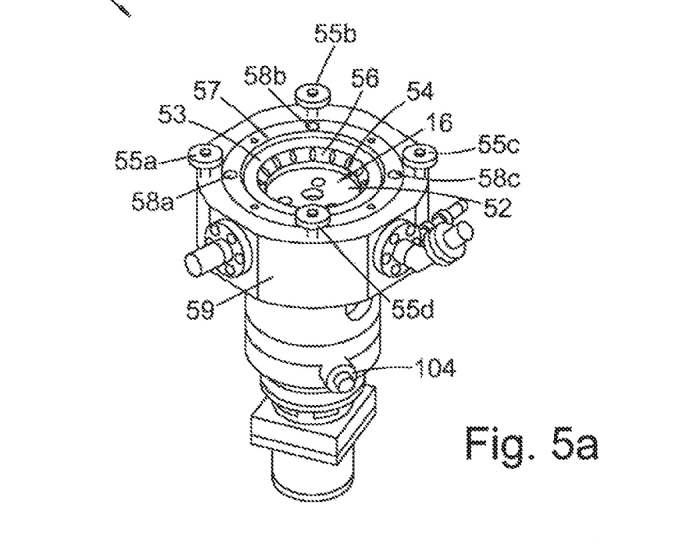
FIG. 5a shows a perspective view of a bottom unit of the ice accretion apparatus, the bottom unit in the form of an ice adhesion test device.
Figure 5B:
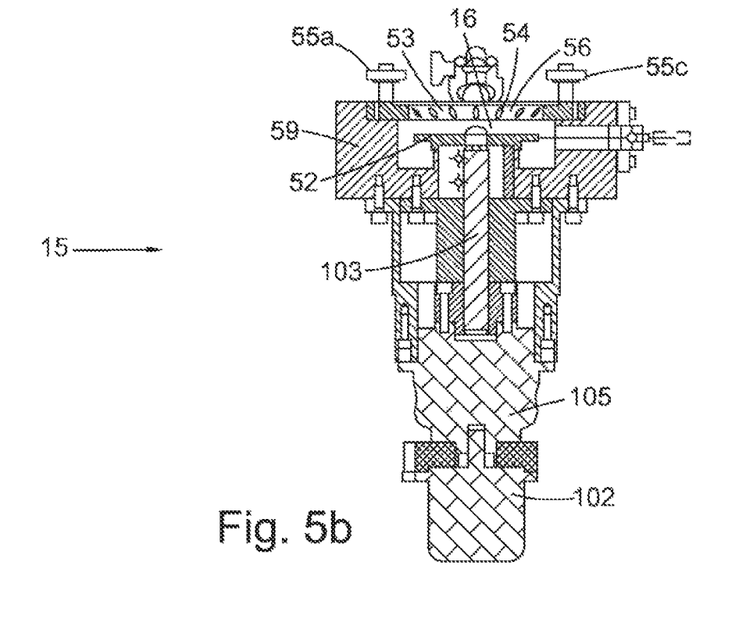
FIG. 5b shows a cross-sectional view of the ice adhesion test device.

FIGS. 5a and 5b show, respectively, a perspective and a cross-sectional view of the ice adhesion test device 15. The ice adhesion test device 15 will now be described with reference to these figures. As mentioned above, the ice adhesion test device 15 forms the bottom unit of the icing device 10. It is arranged to be releasably fastened to the first wall section 17a by male fixings 55a, 55b, 55c, 55d evenly spaced around the top of the body 59 of the ice adhesion test device 15 in positions corresponding to the female fixings 46a, 46b on the second flange 44b of the first wall segment 17a. The male fixings 55a, 55b, 55c, 55d of the ice adhesion test device 15 are substantially the same as the male fixings 45a, 45b, 45c, 45d of the first flange 44b of the first wall segment 17a and so will not be described in further detail here.

As mentioned above in relation to FIG. 1, the ice adhesion test device 15 comprises a target in the form of a well 16. The well 16 is made up of a sample plate 52 and an ice-engagement element in the form of a well side wall 53. The sample plate 52 is substantially circular. It comprises screw-holes to receive screws to enable a sample (not shown) to be fixed to it. The well side wall 53 is defined by an annulus positioned circumferentially around the sample plate 52. The well side wall 53 is also substantially circular. It surrounds the sample plate 52 around the circumference of the sample plate 52. The well side wall 53 has two portions: an inner portion 56, and an outer portion 57. The inner portion 56 is located radially inwardly of the outer portion 57. The inner portion 56 is also axially offset from the outer portion 57, so that the when the ice adhesion test device 15 is assembled, the inner portion 56 is axially (as well as radially) closer than the outer portion 57 to the sample plate 52. The inner portion 56 of the well side wall 53 slopes radially outward away from the sample plate 52.

The inner portion 56 of the well side wall 53 has several recesses 54 on the side of the well side wall 53 closest to the sample plate 52. The recesses 54 are provided to key with ice formed in the well 16 so as to hold the ice substantially stationary with respect to the well side wall 53. In this embodiment, it has sixteen recesses 54. In other embodiments, there may be other numbers of recesses. There may be conceivably any number of recesses provided that the number of recesses is sufficient to key with ice formed in the well 16 and thus to hold it stationary with respect to the well side wall 53. In this embodiment, each recess 54 is substantially the same as each other recess. In this embodiment, the recesses 54 are equally spaced from one another around the inner portion 56 of the well side wall 53.

The outer portion 57 of the well side wall 53 is stepped. The radially-innermost part of the outer portion 57 meets the inner portion 56 at an angle of more than 90° to the inner portion 56. It lies in a plane parallel to the sample plate 52. The radially-outermost part of the outer portion 57 is stepped relative to the radially innermost part so that it is axially above the radially-innermost part. This enables the radially-outermost part of the outer portion 57 to sit flush with the top of the body 19 of the ice adhesion test device 15. The radially-outermost part of the outer portion 57 comprises holes 58a, 58b, 58c, 58d for receiving screws to connect the well side wall 53 to the body 59 of the ice adhesion test device 15.

In the present embodiment, the inner diameter of the inner portion 56 of the well side wall 53 is fixed. The inner diameter is, in the present embodiment, about 40 mm. In an alternative embodiment, the inner diameter of the inner portion 56 of the well side wall 53 can be varied to adjust for different sample sizes or to expose different surface areas of a sample fixed to the sample plate 52. In one such alternative embodiment, the inner diameter of the inner portion 56 of the well side wall 53 is adjustable between about 40 mm and about 100 mm.

The side wall 53 is connected to the top of the body 59 of the ice adhesion test device 15 such that when the ice adhesion test device 15 is connected to the first wall section 17a of the icing device 10, the well 16 formed by the sample plate 52 and side wall 53 is at the bottom of the chamber 18 of the icing device 10. Axially below the sample plate 52, and within the body 59 of the ice adhesion test device 15, is torque means in the form of a motor 102. The motor 102 is of a sort that could readily be implemented by the person skilled in the art without further explanation, and which is thus indicated by cross-hatching in FIG. 5b. The sample plate 52 is connected to the motor 102 via gearing 105 (again of a sort which could readily be implemented by the person skilled in the art and therefore indicated only by cross-hatching) by a shaft 103. The motor 102 is arranged so that it can rotate the sample plate 52 relative to the side wall 53.

The ice adhesion test device 15 also comprises transducer means in the form of a torque ring 104, partially visible in FIG. 5a. The torque ring 104 is arranged to measure the torque on the shaft 103, and to measure both lateral and axial stresses on the shaft.

Assembly

With reference once more to FIG. 1, the assembly of the icing device 10 will now be described.

First, a sample to be tested—in this embodiment, a disc of aluminium NS4 coated with a potentially ice-phobic material—is secured to the sample plate 52. In other embodiments, the sample can be made up of a substrate other than aluminium NS4, and/or a different potentially ice-phobic material. For example, substrate may be a composite material, glass, steel or plastic such as polycarbonate, polyether ether ketone (PEEK) or acrylic.

To assemble the remainder of the icing device 10, the ice adhesion test device 15 is secured to a lab bench (not shown), for example by fitting the body 59 of the ice adhesion test device 15 into a hole in the lab bench. The first wall section 17a is then fitted on top of the ice adhesion test device 15 by attaching the male fixings 55a, 55b, 55c, 55d of the ice adhesion test device 15 to the female fixings 46a, 46b on the second flange 44b of the first wall segment 17a. Next, the second wall section 17b is fitted on top of the first wall section 17a, and the male fixings 45a, 45b, 45c, 45d of the first wall section 17a are secured to the female fixings of the second wall section 17b. Then, the third wall section 17c is fitted on top of the second wall section 17b, and the male fixings of the second wall section are secured to the female fixings of the third wall section 17c. After this, the nozzle device holder 13 is fitted on top of the third wall section 17c and secured in a similar manner. This provides a sealed chamber 18 within the column.

The first (inlet) valves (not shown in FIG. 1) of each of the wall sections are each connected to a transfer tube (not shown) and, via this, to a liquid nitrogen transfer line (not shown). The second (outlet) valves (also not shown) are also each connected to a liquid nitrogen transfer line (again, not shown). The tank 24 (shown in FIG. 2) is filled with distilled water. The water supply line connector 33 of the nozzle device 14 (shown in FIGS. 3a and 3b) is connected to the water supply line 26 (shown in FIG. 2).

Operation

With continued reference to FIG. 1, and with reference, too, to FIG. 4a, the operation of the bench-top ice testing device 10 will now be described.

The chamber 18 is purged of moisture by supplying dry nitrogen through the dry nitrogen connection valve 83. Pressure inside the chamber is reduced by a vacuum pump connected to the butterfly valve 82. The pressure within the chamber can be read from a pressure gauge connected to the overpressure protector 81.

Liquid nitrogen enters the cavity 43 of the first wall section 17a via the first valve 49, cools the first wall section chamber portion 47 and exits the cavity 43 via the second valve 48. The chamber portions defined by the second 17b and third 17c wall sections are cooled by a corresponding operation involving the corresponding valves and cavities of these wall sections 17b, 17c. In this way, the whole of the chamber 18 within the column 11 is cooled. In this embodiment, the flow rate of the liquid nitrogen to the cavity of the first wall section 17a is selected such that the part of the chamber 18 defined by the first wall section 17a is cooled to about −17.5° C. In this way, the part of the chamber 18 defined by the first wall section 17a, which is closest to the sample plate 52, is cold enough that water droplets will freeze on the surface of the sample plate 52. The flow rate of the liquid nitrogen to the cavity of the second wall section 17b is selected such that the part of the chamber 18 defined by the second wall section 17b is cooled to about 0° C. The flow rate of the liquid nitrogen to the cavity of the third wall section 17c is selected such that the part of the chamber 18 defined by the third wall section 17c is cooled to about 10° C. so that water in the nozzle device reservoir 34 and the nozzles 31a, 31b, 31c will not freeze.

In other embodiments, the flow rate of the liquid nitrogen to the cavity of the first wall section 17a is selected such that the part of the chamber 18 defined by the first wall section 17a is cooled down to −40° C., which is accepted as the lowest temperature at which supercooled liquid water droplets are likely to occur in the atmosphere. This ensures that the water droplets formed by the nozzle device 14 freeze on contact with the sample plate 52. For example, in embodiments in which it is desired to produce clear ice on the sample plate 52, the part of the chamber 18 defined by the first wall section 17a is cooled to between 0° C. and −5° C. In embodiments in which it is desired to produce clear or mixed ice on the sample plate 52, the part of the chamber 18 defined by the first wall section 17a is cooled to between −5° C. and −10° C. In embodiments in which it is desired to produce mixed or rime ice on the sample plate 52, the part of the chamber 18 defined by the first wall section 17a is cooled to between −10° C. and −15° C. In embodiments in which it is desired to produce rime ice on the sample plate 52, the part of the chamber 18 defined by the first wall section 17a is cooled to between −15° C. and −40° C. In these other embodiments, the flow rate of the liquid nitrogen to the cavity of the third wall section 17c is selected such that the part of the chamber 18 defined by the third wall section 17c is cooled to conceivably any temperature at which the water in the nozzle device reservoir 34 and the nozzles 31a, 31b, 31c will not freeze, provided that the temperature is not so high that droplets formed by the nozzle device 14 do not freeze on contact with the sample plate 52. For example, in one such other embodiment, the flow rate of the liquid nitrogen to the cavity of the third wall section 17c is selected such that the part of the chamber 18 defined by the third wall section 17c is cooled to 15° C.

In still further embodiments, other techniques are employed to create a temperature gradient (for example one of the above temperature gradients) within the chamber 18.

In one such further embodiment, two or more different cooling fluids are used. In particular, a cooling fluid having one boiling point is passed through the cavity 43 of the first wall section 17a (entering via the first valve 49 and exiting via the second valve 48), and a different cooling fluid with a higher boiling point is passed through the cavities of the second 17b and third 17c wall sections. Alternatively, a cooling fluid having one boiling point is passed through the cavity 43 of the first wall section 17a and through the cavity of the second wall section 17b, and a different cooling fluid with a higher boiling point is passed through the cavity of the third 17c wall section.

The fluid passed through the cavity 43 of the first wall section 17a could be, for example, liquid nitrogen, with the fluid passed through the cavity of the third wall section 17c being, for example, liquid argon (and either fluid being used for the second wall section 17b). In another example, the fluid passed through the cavity 43 of the first wall section 17a could be, for example, helium-4, with the fluid passed through the cavity of the third wall section 17c being, for example, liquid nitrogen (and either fluid being used for the second wall section).

In another such further embodiment, a cooling fluid (such as liquid nitrogen) is first passed through the cavity 43 of the first wall section 17a to cool the part of the chamber 18, and is then recirculated through the cavity of the second wall section 17b and then the third wall section 17c. In this way, the cooling fluid is heated as it passes through each cavity. Thus, it provides reduced cooling to each part of the chamber 18 defined by the successive wall sections through the cavity of which the cooling fluid passes.

In yet another such further embodiment, one or more of the heater jackets is operated to heat a portion of the chamber. For example, the heater jacket around the third wall section 17c can be operated to increase the temperature of the portion of the chamber 18 defined by this wall section 17c with respect to temperatures of the portions of the chamber 18 defined by the first 17a and second 17b wall sections. In another example, the heater jackets around the third wall section 17c and the second wall section 17b are both operated, but at different temperatures. Specifically, the heater jacket around the third wall section 17c is operated at a higher temperature than the heater jacket around the second wall section 17b, so as to increase the temperature of the portion of the chamber 18 defined by the third wall section 17c with respect to the temperature of the portion of the chamber 18 defined by the second wall sections 17b, which is in turn increased with respect to the temperature of the portion of the chamber 18 defined by the first wall section 17a.

Returning now to the description of the operation of the first-described embodiment of the bench-top ice testing device 10, water in the tank 24 is heated by the tank heater 23. Water is pumped by the pump 21 from the tank 24 into the water supply line 26. The water is further heated in the water supply line 26 by the trace heater 27. In this embodiment, the water is heated to a temperature of about 40° C. In other embodiments, the water can be heated to other temperatures. It is envisaged that the water be heated to a temperature which is high enough that the water does not freeze on contact with the nozzles 31a, 31b, 31c. The nozzles 31a, 31b, 31c would otherwise be cold enough to freeze at least some of the water since they are within the cooled chamber 18. In particular, it is envisaged that the water be heated to a temperature between about 20° C. and 95° C.

The water enters the nozzle device reservoir 34 and each of the nozzles 31a, 31b, 31c. The pressure applied to the water by the pump 21 causes it to exit the nozzle outlets 35a, 35b, 35c, producing water droplets in a spray.

In this way, water droplets of a specified size—in this embodiment, the droplets have a diameter of about 10 to 50 microns ($10\times10^{-6}$ m to $50\times10^{-6}$ m), with an average diameter of around 35 microns ($35\times10^{-6}$ m)—are ejected from the nozzle device 14. The speed of the droplets is increased by the increased pressure in the nozzle device reservoir 34 created by the pump 21. The increased pressure in the nozzle device reservoir 34 also affects the size of the water droplets generated. In particular, by increasing the pressure in the nozzle device reservoir 34, the droplet size is decreased. In other embodiments, other droplet diameters may be desired. These can be achieved by increasing or decreasing the pressure in the nozzle device reservoir using the pump 21. Alternatively, or in addition, an alternative nozzle device can be used, with nozzle outlets of a different diameter to those of the present embodiment.

The droplets travel vertically downwards through the chamber 18 towards the well 16 of the ice adhesion test device 15, and the sample within this well 16. As the water droplets travel through the chamber 18, they are supercooled. When they impact the sample plate 52, they freeze. In this embodiment, due to the particular selection of water droplet size and chamber 18 temperature, rime ice is formed on the sample. The ice formed on the sample plate 52 can be viewed through the viewing port 19 to determine when sufficient ice has accreted to stop operation of the nozzle device 14. The nozzle device 14 continues to be operated as described above until a layer of rime ice is formed on the sample and on the side wall 53 of the well 16. The rime ice also enters the recesses 54 in the side wall 53 of the well 16. The gate valve 25 in the supply line 26 (shown in FIG. 2) is then closed, and the pump 21 switched off. Thus, the formation of droplets is stopped.

In other embodiments, the droplet diameter and temperature gradient within the chamber 18 are different, such that other types of ice are formed in the well 16. For example, when cooled water droplets impact the surface of the sample plate 52 and side wall 53 and wet the surface before freezing, glaze ice is formed.

In yet other embodiments, in order to simulate icing conditions in which rain falls and is subsequently frozen, water droplets are formed (substantially in the manner described above) before the chamber is cooled. Thus, the water droplets impact the sample plate 52 without freezing, and are only subsequently frozen by cooling the chamber 18 in the manner described above.

In still other embodiments, rather than generating a substantially continuous spray of water droplets (as described above), the flow of water to the nozzle device reservoir 34 and each of the nozzles 31*a*, 31*b*, 31*c* is periodically interrupted by closing the gate valve 25. For example, in one of these embodiments, water is pumped by the pump 21 to the nozzles 31*a*, 31*b*, 31*c* (and heated) as described above. The gate valve 25 is opened for 5 seconds, and then closed for 10 seconds. This opening and closing of the gate valve 25 is repeated. Thus, a spray of water droplets falls on the sample plate 52 for 5 seconds, at 10-second intervals. This method can be used to create layers of ice on the sample plate 52, since the water droplets that have fallen on the sample plate 52 have time to freeze (while the gate valve 25 is closed) before the spray of water droplets is resumed.

Returning to the description of the first-described embodiment, next, the shear strength with which the ice is adhered to the sample is measured using the ice adhesion test device 15. With reference now to FIGS. 5*a* and 5*b*, the operation of the ice adhesion test device 15 will now be explained. Power is supplied to the motor 102 so that it applies torque to try to turn the shaft 103, and thus the sample plate 52. The recesses 54 in the side wall 53 of the well 16 prevent rotation of the layer of rime ice relative to side wall 53. The motor 102 thus acts against the ice adhered to the sample. The torque at which the ice separates from the sample plate 52 is measured by the torque ring 104. From the measured torque at which the ice separates from the sample plate 52, the shear strength of adhesion of ice to the sample plate 52, and the stress on the ice when it separates from the sample plate 52 can be calculated.

Thus, the above-described embodiment provides a bench top icing device 10 that produces water droplets of a specified size at a specified temperature. The ice adhesion test device 15 can be used in conjunction with the bench top icing device 10 to determine the shear strength with which ice adheres to a sample.

In this embodiment, once the test has been run, the flow of liquid nitrogen into the transfer lines is turned off. Thus, the supply of liquid nitrogen to the cavity within each wall section is stopped and the chamber 18 is no longer cooled. Next, the ice adhesion test device 15 is removed from the first wall section 17*a*. The electric heater jackets around each of the wall sections are then switched on. In this way, the cavity 18 is heated. This enables the cavity 18 to be dried out before the next test is run. In other embodiments, depending on the desired temperature within the cavity 18 during a test, the flow of liquid nitrogen into the transfer lines can be turned off before a test or during a test.

Runback Ice Test Device

It is envisaged that other bottom units can be used with the icing device 10 as described above. In a second embodiment, the bottom unit of the ice accretion apparatus is in the form of a runback ice test device. The ice accretion apparatus of this embodiment is in the form of an icing device 10 as described above, but a runback ice test device is connected to the body 59 of the ice adhesion test device.

The runback ice test device in this embodiment is made up of a runback ice test fitting 60, and the same motor 102 and gearing 105 as used in the ice adhesion test device 15. In other embodiments, a dedicated motor and gearing can be used for the runback ice test device. The runback ice test fitting 60 is connected to the motor 102 (this is not shown in the figures) as will be described in more detail below.

FIGS. 6*a* to 6*d* show different perspective views of the runback ice test fitting 60. The runback ice test fitting 60 will now be described with reference to these figures. The runback ice test fitting 60 comprises a runback ice test target in the form of a platform 61. The platform 61 can be most clearly seen in FIG. 6*d*. In this embodiment, the platform 61 is rectangular. The platform 61 has an upper face 62. The platform 61 is divided into two sections: a first section 63 and a second section 64. The first 63 and second 64 sections are both rectangular. The first 63 and second 64 sections are of the same width and depth. In this embodiment, the first section 63 is longer than the second section 64. The first section 63 therefore has a greater surface area than the second section 63.

Figure 6A:
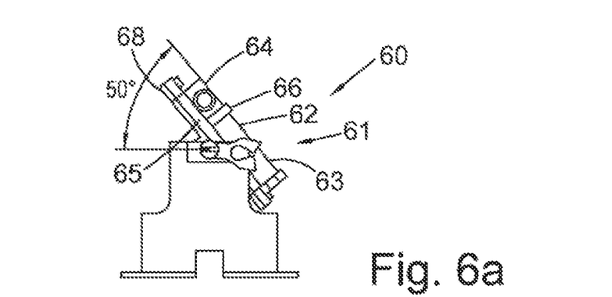
FIGS. 6a to 6d show different perspective views of an alternative bottom unit of the ice accretion apparatus, the alternative bottom unit in the form of an ice runback test device.
Figure 6B:
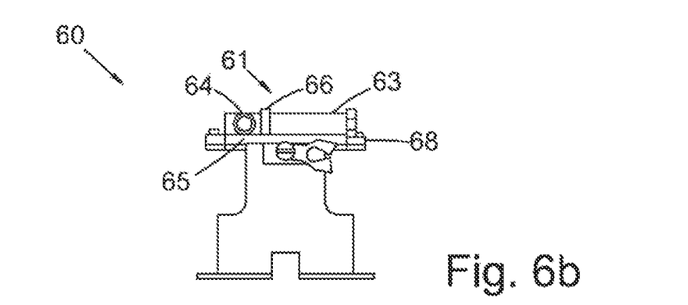
Figure 6C:
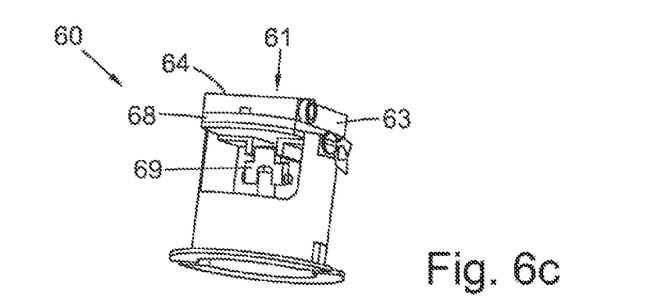
Figure 6D:
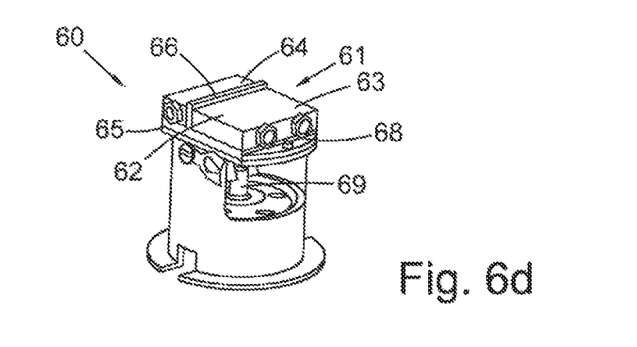
Figure 7:
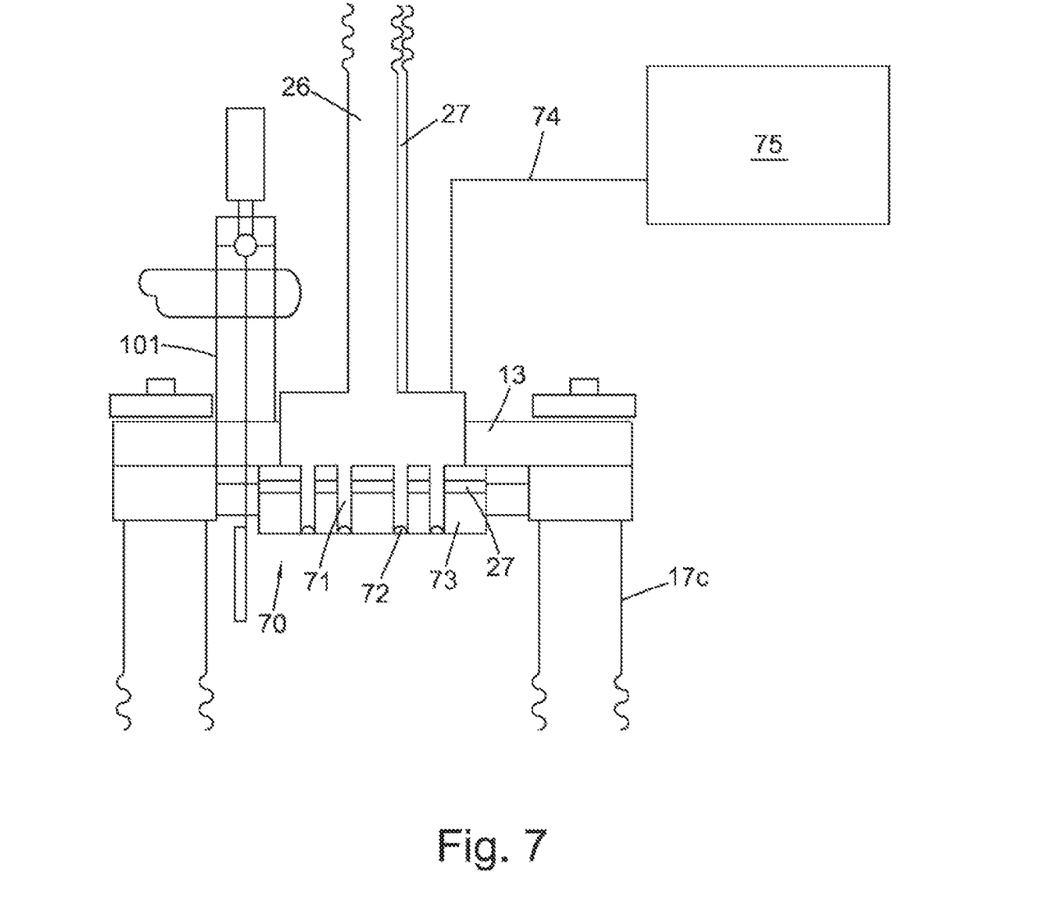
FIG. 7 shows a schematic cross-sectional view of an alternative droplet discharge device fitted to the top of the ice accretion apparatus.

In this embodiment, the platform 61 has a thickness of about 2 mm, a width of about 58 mm, and a length of about 45 mm. In other embodiments, the platform 61 may have different dimensions, provided that these are not so great that the platform 61 does not fit within the chamber 18.

The first 63 and second 64 sections of the platform 61 are arranged on a thermally insulating component 65. The thermally insulating component 65 is, in this embodiment, made from polytetrafluoroethylene (PTFE), although other materials with good thermal insulation properties can be used in other embodiments. The thermally insulating component 65 has a base 66 shaped as a rectangle with an area sufficient to accommodate the first 63 and second 64 sections of the platform 61. The thermally insulating component 65 also has a protrusion 66. The protrusion 66 provides a protruding thermal barrier between the first section 63 and the second section 64 of the platform 61. The protrusion 66 runs from one of the longer sides of the base 66 to the opposite side. In other words, the protrusion 66 runs across the width of the platform 61. It has substantially flat sides against which the first section 63 and second section 64 of the platform 61 abut. The protrusion 66 has a height which is slightly greater than the height of the first 63 and second 64 sections of the platform 61 so that it protrudes above the upper face 62 of the platform.

The first 63 and second 64 sections of the platform 61 have heater elements within them (not shown). The heater elements are independently-controllable electric heaters. They are arranged to heat the upper face of the platform 61. The heater elements are each connected to a heater means controller in the form of a heater elements controller (also not shown). The heater elements controller is arranged to switch the heater elements on and off independently of each other. In this embodiment, the heater elements controller is additionally arranged to control the temperature to which each of the heater elements is heated.

The thermally insulating component 65 with the platform 61 mounted on top of it is in turn mounted to a pivoting plate 68. The pivoting plate 68 is pivotally mounted to platform inclination means made up of, in this embodiment, the motor 102, gearing 105 and a coupling 69 (the motor 102 and gearing 105 are not shown in FIGS. 6*a* to 6*d*). The coupling 69 connects the pivoting plate 68 via the gearing 105 to the motor 102. The coupling 69 and gearing 105 are arranged such that the turning of the motor 102 inclines the pivoting plate 68 so that the second section 64 of the platform is above the first section 63 of the platform. The coupling 69 is arranged to hold the pivoting plate 68 in the inclined position when the motor 102 stops turning.

Assembly

The bench-top icing device to be used with the ice runback test device is assembled substantially as described above in relation to the icing device 10 to be used with the ice adhesion test device 15, except that the ice runback test device is substituted for the ice adhesion test device 15 during assembly.

Operation

With reference to FIGS. 1 and 6, the operation of the bench-top ice testing device of this second embodiment will now be described. First, the platform 61 is positioned. The motor 102 is made to turn. This turning of the motor 102 causes the coupling 69 to pivot the pivoting plate 68 such that the second section 64 of the platform 61 is above the first section 63 of the platform 61. In this embodiment, the pivoting plate 68 is pivoted to an angle of 50°, although in other embodiments the pivoting plate 68 can be pivoted to other angles to test runback ice at these other angles. When the pivoting plate 68 has been pivoted to the desired angle, the motor 102 is stopped.

Next, the chamber 18 is cooled substantially as described above, using liquid nitrogen. The heater element of the first section 63 of the platform 61 is switched on. In this particular embodiment, the first section 63 is heated to a temperature of about 30° C. In other embodiments, the first section 63 can be heated to other temperatures. It is envisaged that the first section 63 be heated to a temperature that is representative of an electro-thermal ice protection system that would be used with the potentially ice-phobic coating.

Super-cooled or cooled droplets are then created substantially as described above in relation to the first embodiment; that is by ejecting droplets of water from the nozzle device 14.

The droplets are deposited on the platform 61. Since the second section 64 of the platform 61 is unheated, the droplets form rime ice on the second section 64. In other embodiments, as discussed above, glaze ice or a mixture of glaze ice and rime ice is formed on the second section 64. Since the first section 63 of the platform 61 is heated, no ice is formed on the first section 63. The protrusion 66 prevents ice formed on the second section 64 from extending onto the first section 63 of the platform 61. The protrusion 66 acts as a thermal barrier between the first section 63 and the second section 64.

As in the first embodiment, the accretion of ice can be viewed through the viewing port 19. When sufficient ice is determined to have been deposited on the second section 64 of the platform 61, operation of the nozzle device 14 is stopped (as described above in relation to the first embodiment). Thus, no more droplets land on the platform 61.

The heater element of the first section 63 of the platform 61 is switched off. The first section 63 is allowed to cool to, in this embodiment, a temperature of about −15° C. In other embodiments, other temperatures can be selected, depending on the atmospheric conditions that an operator wishes the test to approximate. For example, in other embodiments, the first section 63 can be allowed to cool to a higher temperature than in this embodiment: between 0° C. and −15° C. The heater element of the second section 64 of the platform 61 is switched on. The ice that was formed on the second section 64 begins to melt. Water from the melting ice runs downwards, over the protrusion 66 and on to the first section 63 of the platform 61. The water freezes on the first section 63 of the platform 61, forming runback ice.

In other embodiments, other angles of the pivoting plate 68 and other temperatures to which the first 63 and second 64 sections are heated and cooled can be selected, and different thicknesses of ice can be allowed to build up on the second section 64. In this way, the formation and behaviour of runback ice can be studied under many different conditions.

Once the test has been run, the flow of liquid nitrogen into the transfer lines is turned off. Thus, the supply of liquid nitrogen to the cavity within each wall section is stopped and the chamber 18 is no longer cooled. As in the first embodiment, the electric heater jackets around each of the wall sections are switched on such that the cavity 18 is heated and dried out before the next test is run. The ice runback test device is then removed from the body 59. In other embodiments, depending on the desired temperature within the cavity 18 during a test, the flow of liquid nitrogen into the transfer lines can be turned off before a test or during a test.

Other Embodiments

It is envisaged that the ice accretion apparatus may include, in other embodiments, additional components, or that some of its components may be replaced with alternative components.

For example, in one such alternative embodiment, the ice accretion test device, still in the form of a bench-top icing apparatus, additionally has an insulated jacket around each section of the column.

In another alternative embodiment, the apparatus comprises valve means for introducing a volume of gas into the chamber and for sealing the volume of gas in the chamber. The valve means is in the form of a two-way valve that extends through a wall of the chamber, for example through the viewing port of the apparatus, such that when open, it can connect the chamber within the bench-top icing device with an external gas supply and allow gas into the chamber. When closed, the two-way valve seals the chamber.

In yet another alternative embodiment, the apparatus comprises pumping means for producing a reduced pressure in the chamber. In this embodiment, the apparatus has a two-way valve extending through the wall of the chamber, for example through the viewing port of the apparatus. The pumping means is in the form of a vacuum pump. The vacuum pump is connected via a tube to the two-way valve. When open, and when the pump is switched on, the valve allows through gas from within the chamber. The pump sucks the gas through the valve and discharges it. In this way, the pressure within the chamber can be reduced. In this embodiment, the column is constructed to withstand pressures down to at least 14.1 kPa (kilopascal).

In a further alternative embodiment, the apparatus comprises a main controller. In this embodiment, the main controller is in the form of a microcontroller. The microcontroller is connected to a sensor device of the type described in relation to the first embodiment, so that it can receive pressure and temperature signals from the sensor device. The microcontroller is also connected to valve means and pumping means as described in relation to the two alternative embodiments just described so that it can control these and thereby control pressure within the chamber. Finally, the microcontroller is connected to chamber heating means as described above in relation to the first embodiment so that it can control this and thereby control the temperature within the chamber. The microcontroller is programmed to control the pressure and temperature based on signals from the sensor device.

In yet further alternative embodiments, the apparatus comprises more or fewer tubular segments.

For example, in one such alternative embodiment, the apparatus comprises only two tubular segments. One of these tubular segments is substantially the same as the first wall section described in relation to the first embodiment. The other tubular segment is substantially the same as the third wall section described in relation to the first embodiment. In this alternative embodiment, the height of the column is therefore smaller than the height of the column in embodiments in which there are three tubular segments (such as the first embodiment). This results in a more compact apparatus.

In a second such alternative embodiment, there are four tubular segments. The apparatus is substantially as described above in relation to the first embodiment, except that it has an additional wall section between the first and second wall sections. This additional wall section is substantially the same as the second and third wall sections of the first embodiment. The height of the column in this alternative embodiment is therefore greater than the height of the column in the first embodiment. This results in the droplets generated by the nozzle device having a higher velocity when they hit the target at the bottom of the column than they would in an icing device with fewer tubular segments.

In another alternative embodiment, the droplet discharge device is a piezoelectric device 70, instead of a nozzle device 14. The piezoelectric device 70 is shown schematically, in cross-section, in FIG. 7. With reference to this figure, the piezoelectric device 70 will now be described in more detail.

The piezoelectric device 70 is made up of a plate 73 with a number of through-holes in the form of water channels 71. The number of water channels 71 is selected to provide enough water droplets to provide the desired icing conditions, based on each water channel 71 producing one water droplet at a time (as will be explained further below).

In this embodiment, the diameter of the plate 73 is selected to be less than the diameter of the area to be sprayed with droplets, to account for the outward spread of water droplets. In another embodiment, however, the diameter of the plate 73 is selected to be substantially the same as the diameter of the area to be sprayed with droplets. The plate 73 has a trace heating element 27 around its circumference. This is in order to heat the plate 73.

Each water channel 71 contains a piezoelectric element in the form of a piezoelectric crystal 72. The piezoelectric crystals 72 are each arranged so that when a current flows through them, they bend so as to draw water from their respective water channel 71 into the space created by this deformation. When no current is supplied, the piezoelectric crystals 72 return to their original shape. The piezoelectric crystals 72 are each arranged so that when this occurs, they eject a droplet of water from their respective water channel 71. Each piezoelectric crystal 72 is connected via an electrical connection 74 to a combined power source and controller 75. This is in order to supply current from the power source and controller 75 to the piezoelectric crystals 72 and to control the magnitude of the current supplied.

The type of piezoelectric crystal 72 is selected according to the size of the droplet which it is desired to eject from a water channel 71. A piezoelectric crystal 72 which deforms relatively greatly under a given electric current will eject a relatively large volume of water when it relaxes after deformation. The type of piezoelectric crystal 72 is also selected according to the speed with which it is desired to eject a droplet from a water channel 71. In particular, a type of piezoelectric crystal 72 that relaxes relatively rapidly after deformation in response to a current being passed through it will eject a droplet through from a water channel 71 at a relatively great speed.

The piezoelectric device 70 is fitted into the droplet discharge device holder 13 in place of the nozzle device 14. The remainder of the water droplet generation system 20 to which the piezoelectric device is connected is substantially the same as that described above in relation to FIG. 2. In other words, the piezoelectric device 70 is connected to a water supply line 26 with a trace heater 27, and to a pump 21 and tank 24, and all the other components shown in FIG. 2.

In operation, water is supplied to the water channels 71 from the water supply line 26. The power source and controller 75 is operated to supply current, via the electrical connection 74, to the piezoelectric crystals 72. This bends the piezoelectric crystals 72 in a first direction so as to draw water from their respective water channel 71 into the space created by this deformation. The current through the piezoelectric elements 72 is then stopped so that they return to their original shapes and push the water out in the form of water droplets. The magnitude of the current supplied to the piezoelectric crystals 72 is selected using the controller 75 so as to determine the magnitude of deformation of the piezoelectric crystals 72. This, in turn, controls the size of the droplets produced by the piezoelectric device 70.

The invention claimed is:

1. An ice adhesion test device, comprising:

an ice adhesion test target in the form of a well in which, in use, a layer of accreted ice is built up, wherein the ice adhesion test target comprises a sample plate at the bottom of the well and an ice-engagement element positioned circumferentially around the sample plate and providing a side wall of the well, and wherein the sample plate is rotatable relative to the ice-engagement element;

a torque means for applying a rotational torque between the sample plate and the ice-engagement element; and a transducer means for, at least at a point at which the layer of accreted ice separates from the sample plate, measuring the rotational torque and/or the stress on the ice.

2. The ice adhesion test device of claim 1, wherein the sample plate is rotatable, the torque means is arranged to apply the rotational torque to the sample plate and the ice-engagement element is fixed in position.

3. The ice adhesion test device of claim 1, wherein the torque means is arranged to try, in use, to rotate the sample plate relative to the ice-engagement element against the resistance of the layer of accreted ice.

4. The ice adhesion test device of claim 1, wherein the ice-engagement element is shaped to prevent rotation of the layer of accreted ice relative to the ice-engagement element.

5. The ice adhesion test device of claim 4, wherein the ice-engagement element has a non-circular inner peripheral wall.

6. The ice adhesion test device of claim 1, wherein the side wall of the well has protrusions for keying with the layer of accreted ice to prevent rotation of the layer of accreted ice relative to the ice-engagement element.

7. The ice adhesion test device of claim 1, wherein the side wall of the well has recesses for keying with the layer of accreted ice to prevent rotation of the layer of accreted ice relative to the ice-engagement element.

8. The ice adhesion test device of claim 1, wherein the ice engagement element is roughened to prevent rotation of the layer of accreted ice relative to the ice-engagement element.

9. The ice adhesion test device of claim 1, wherein the ice-engagement element is arranged to define an area to be exposed to water droplets, and wherein the side wall is arranged to be adjustable in diameter.

10. The ice adhesion test device of claim 1, wherein the sample plate is between 40 millimeters and 100 millimeters in diameter.

11. The ice adhesion test device of claim 1, wherein the ice adhesion test device further comprises a sample fixed to the sample plate.

12. The ice adhesion test device of claim 11, wherein the sample comprises one or more of: a composite material, glass, metal, aluminium, steel, plastic, polycarbonate, polyether ether ketone (PEEK) and acrylic.

13. The ice adhesion test device of claim 11, wherein the sample is between 1 millimeter and 15 millimeters in thickness.

14. A runback ice test device, comprising:
a runback ice test target comprising a platform having an upper face which is separated into a first section and a second section by a protruding thermal barrier;
platform inclination means arranged to incline the platform such that the second section is above the first section;
a first heater means for producing localized heating of the first section of the platform for keeping the first section of the platform substantially free of accreted ice as a layer of accreted ice is, in use, built up on the second section of the platform;
a second heater means for producing localized heating of the second section of the platform for producing, when the platform is inclined, runback of melted ice from the layer of accreted ice and over the barrier and onto the first section of the platform; and
a controller for independently switching on and off the first and second heater means.

15. The runback ice test device of claim 14, wherein the platform inclination means is arranged to adjust the angle of inclination of the platform of the runback ice test target.

16. The runback ice test device of claim 14, wherein the platform comprises one or more of: a composite material, glass, metal, aluminium, steel, plastic, polycarbonate, polyether ether ketone (PEEK) and acrylic.

17. The runback ice test device of claim 14, wherein the platform has a thickness of between 1 millimeter and 5 millimeters and/or a width of between 40 millimeters and 70 millimeters and/or a length of between 40 millimeters and 70 millimeters.

18. The runback ice test device of claim 7, wherein the platform has a thickness of 2 millimeters and/or a width of 58 millimeters and/or a length of 45 millimeters.

19. The runback ice test device of claim 14, in which the controller is additionally for controlling the temperature to which the first and second heater means are heated.

20. An ice adhesion test device comprising:
an ice adhesion test target in the form of a well in which, in use, a layer of accreted ice is built up, wherein the ice adhesion test target comprises a sample plate at the bottom of the well and an annulus positioned around the periphery of the sample plate;
a torque means for applying a rotational torque between the sample plate and the annulus and for increasing the rotational torque; and
a transducer means for sensing the rotational torque and/or stress on the sample plate.

* * * * *

UNITED STATES PATENT AND TRADEMARK OFFICE
CERTIFICATE OF CORRECTION

Page 1 of 1

PATENT NO. : 11,009,437 B2
APPLICATION NO. : 16/302702
DATED : May 18, 2021
INVENTOR(S) : Houghton et al.

It is certified that error appears in the above-identified patent and that said Letters Patent is hereby corrected as shown below:

In the Claims

Column 22, in Line 13, replace "device of claim 7" with -- device of claim 17 --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*